United States Patent [19]

Findeis et al.

[11] 4,214,834
[45] Jul. 29, 1980

[54] PHOTOGRAPHIC COPYING MACHINE

[75] Inventors: Günter Findeis, Sauerlach; Wolfgang Zahn, Munich; Klaus Weber, Leverkusen, all of Fed. Rep. of Germany

[73] Assignee: AGFA-Gevaert, A.G., Leverkusen, Fed. Rep. of Germany

[21] Appl. No.: 74,116

[22] Filed: Sep. 10, 1979

[30] Foreign Application Priority Data

Sep. 14, 1978 [DE] Fed. Rep. of Germany ....... 2840049

[51] Int. Cl.² .............................................. G03B 27/44
[52] U.S. Cl. ....................................... 355/46; 355/38; 355/64
[58] Field of Search ...................... 355/46, 38, 68, 50, 355/51, 64, 65

[56] References Cited

U.S. PATENT DOCUMENTS

| 2,849,916 | 9/1958 | Nolan | 355/64 |
| 4,088,401 | 5/1978 | Rees et al. | 355/46 X |
| 4,110,023 | 8/1978 | Silverberg | 355/46 X |
| 4,113,370 | 9/1978 | Durbin | 355/46 X |

*Primary Examiner*—Richard A. Wintercorn
*Attorney, Agent, or Firm*—Michael J. Striker

[57] ABSTRACT

A lengthy strip of originals is transported along a transport path. Positioned along the transport path are a plurality of copying stations, for simultaneous copying of plural successive originals. The originals are transported setwise or batchwise, thereby lowering the average transport time per individual original and increasing copying-machine productivity without the need to speed up the performance of other operations attendant to copying-machine operation. When originals are correctly spaced and all copiable, they are processed setwise or batchwise as just outlined. When not spaced in accordance with a standard and/or when not all copiable, the machine changes over to one-at-a time operation, disabling all but the most downstream copying station, until the arriving originals are again all copiable and spaced by the standard distance. During normal operation, a strip of print paper is advanced by an increment corresponding to the plural concurrently exposed originals. During one-at-a-time copying, the strip of print paper is advanced one print at a time, and the strip of originals is advanced until the next copiable original arrives at the most downstream station.

7 Claims, 1 Drawing Figure

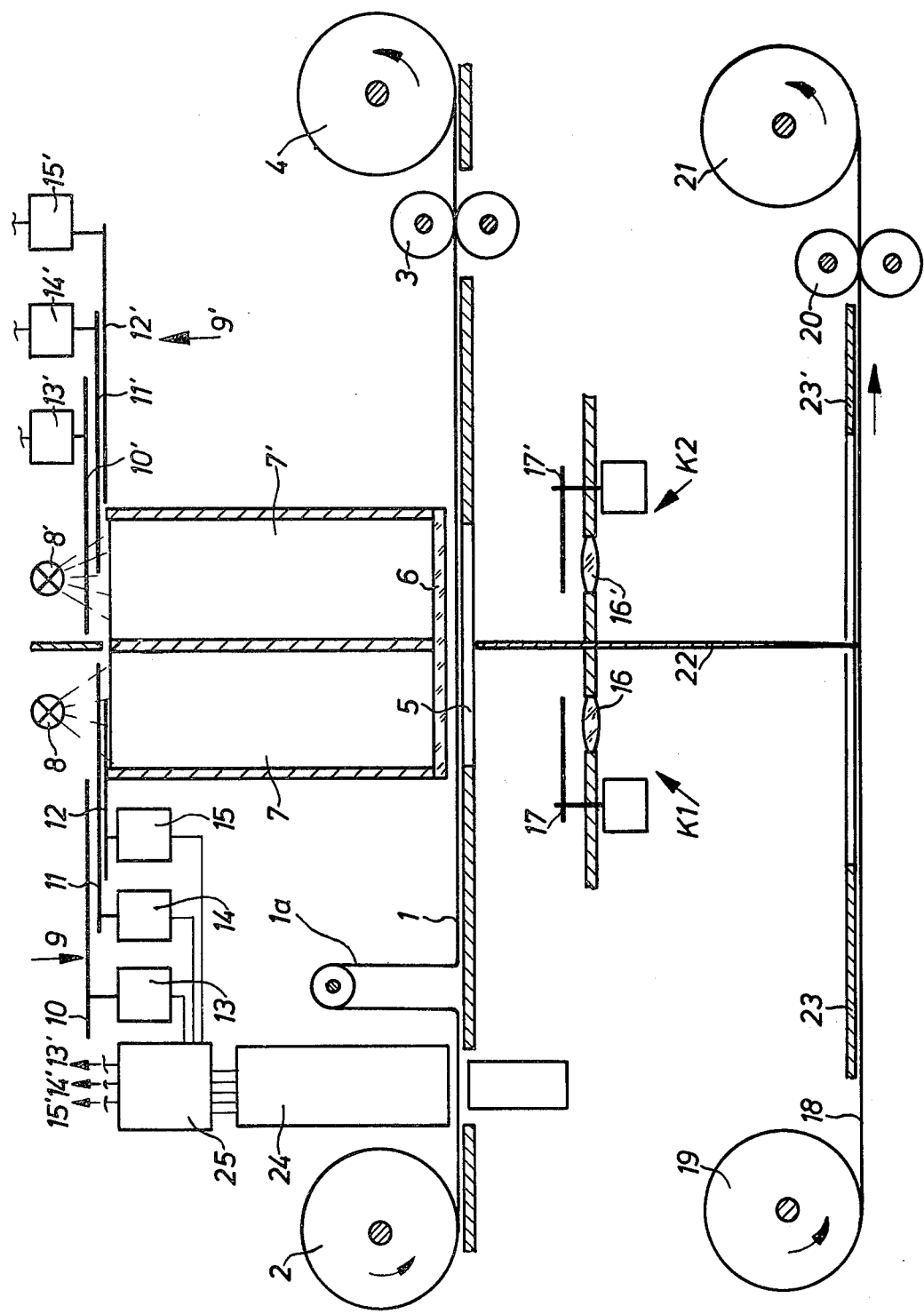

PHOTOGRAPHIC COPYING MACHINE

BACKGROUND OF THE INVENTION

The present invention concerns photographic copying machines for copying originals of a long strip of originals. Typically, such copying machines are provided with an automated or semi-automated evaluating station where successive originals are evaluated with respect to their densities in three component colors and/or with respect to their position on the long strip of originals; alternatively, information representing the result of such evaluation may have been earlier generated and marked onto the originals themselves or onto a data-carrier strip which travels in synchronism with the strip of originals, in which case the evaluating station of the machine is mainly a code reader which reads the results of the earlier evaluation. Such copying machines are furthermore provided with automatic exposure constrol systems controlled by the data generated as a result of the aforementioned evaluation, and are provided with an exposure system, projection optics for projecting an image of each original onto photographic paper or other copying medium guided along a predetermined path, and typically comprise an adjustable set of color filters for controlling the component colors and often a shutter for blocking exposure light intermediate successive copying operations.

Conventional photographic copying machines of the types referred to above have had their productivity brought up to as high as 12,000 copies per hour. Further increase in copying-machine productivity is extremely difficult to achieve, because the constituent operations involved in one copying cycle are nowadays already performed as quickly as a reasonable level of technology will permit. The duration of a copying cycle is mainly comprised of the time intervals required to advance the strip of originals and to advance the strip of copying paper, the time interval required for automated or semiautomated evaluation of each original, and the time interval required for the copying exposure per se. Although a machine productivity on the order of 12,000 copies per hour may appear quite considerable, during certain seasons of the year photographic processing laboratories find this rate of productivity not sufficient to keep up with customer demand.

SUMMARY OF THE INVENTION

It is a general object of the present invention to be able to rather markedly boost the productivity of such photographic copying machines by resort to a relatively simple technique which need not place increased demands upon the degree of technology employed, i.e., which can essentially make use of conventional machine subsystems.

In accordance with the present invention, there are provided, along the transport path of the transported strip of originals to be copied, plural copying stations, at which copying exposures can be performed simultaneously. As a result, originals can be copied in sets of two or batches of greater number.

Utilizing the inventive technique, with two copying stations instead of one, the productivity of a typical photographic copying machine can readily be boosted by at least 60%, i.e., yielding a productivity level of more than 19,000 copies per hour, without requiring any speed-up of the rates of performance of constituent operations such as film transport, copying paper transport, evaluation of originals or copying exposure duration per se.

A main reason for the great productivity boost attendant to the concept of the present invention relates to film and paper transport. In a two-station machine in which the strip of originals is normally transported a distance equal to the length of two originals before being stopped for the copying exposures, the time interval required to incrementally advance the strip this double length is not equal to twice that required to incrementally advance the strip one original at a time, but instead is considerably lower than twice such time. The time interval normally required to incrementally advance a strip of originals by the length of one original is, to a very great extent, attributable to the time required to accelerate the strip from a condition of standstill and thereafter decelerate the strip to a condition of standstill; the high-speed transport action occuring intermediate strip acceleration and deceleration proceeds for a time interval representing only a fraction of the total one-frame advancement duration. Thus, if the strip is incrementally advanced two originals at a time, the durations of the acceleration and deceleration intervals will be substantially the same as ordinarily, and the greater length of strip to be transported is for the most part transported during the high-speed phase of strip transport, resulting in a much less than proportional increase in the total interval required for the two-frame incremental advancement. Approximately, a two-original incremental transport in accordance with the present invention consumes about 1.5 times as much time as a conventional one-original incremental transport, which reduces the average transport duration per original down to on the order of 75% its normal or conventional value.

All the various other constituent time intervals of the total exposure cycle—e.g., evaluation of the originals and the provision of coded evaluation markings on the originals, and the various unavoidable dead times involved in the motion of moving parts of the machine—can remain at the same values as conventionally, i.e., so as to be effectively halved when references to each single original of the incrementally advanced pairs of originals. In the case of a two-station approach, the various time savings which result can increase machine productivity by a factor on the order of about 1.6.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE schematically represents one exemplary embodiment of the present invention.

DESCRIPTION OF THE PREFERRED EMBODIMENTS

In the FIGURE, numeral 1 denotes a strip of originals which is transported by means of a transport system 3 from a supply reel 2 to a take-up reel 4. Located along the transport path of strip 1 is a strip accumulator 1a and an exposure frame 5 for originals, e.g., photographic negatives. Exposure frame 5 has an area so dimensioned as to be able to accommodate two adjoining originals on the strip of originals 1. Mounted above the exposure frame 5 is a light-diffusing plate 6 which covers over the outlet ends of two immediately neighboring internally mirrored light chutes 7 and 7'. Respective exposure light sources 8 and 8' are located at the inlet ends to these light chutes. Located between each light chute 7 or 7' and its exposure light source 8 or 8' is a respective filter system 9 or 9'. Filter system 9 comprises color filters 10, 11 and 12 which can be swung into the light path of light source 8 by means of respective motors 13, 14 and 15. Similarly, filter system 9' comprises color filters 10', 11', 12' driven by motors 13', 14', 15'. Located at the opposite side of the exposure frame 5, on the optical axis of light chute 7, is a projection optics 16 which can be blocked from exposure light by means of a respective motor-driven shutter 17. Located on the optical axis of the other light chute 7' is a similar projection optics 16' provided with a respective shutter 17'. Photosensitive copying medium 18, e.g., a strip of photographic print paper, is located in the image plane of the projection optics 16, and is transported by means of a transport system 20 from a supply reel 19 to a take-up reel 21. The image plane of the other projection optics 16' likewise coincides with the plane of the copying medium 18. A separating wall 22 extends normal to the plane of the copying medium 18 from the exposure frame 5 on down and serves to prevent the exposure light of one of the two copying stations K1, K2 from being incident on the section of copying medium 18 currently associated with the other of the two copying stations. Separating wall 22 extends down to the photosensitive material 18 with a relatively sharp bottom edge, i.e., being very thin at the plane of the copying medium 18, so that the separating wall 22 not cover more than a minimal line-like zone of the copying medium at the image plane. Whereas one side of each copying-medium section to be exposed is defined by the lower edge of separating wall 22, the other three sides of each of the two adjoining exposed sections are defined by respective exposure masks 23 and 23'.

Located intermediate the supply reel 2 for the strip of originals 1 and the two light chutes 7, 7' is an evaluating station 24 at which successive originals are evaluated with respect to their densities in each of their three component colors. Evaluating station 24 also reads notches or perforations provided on the strip 1, concerning the location of individual originals, the starts and ends of individual customer orders, etc. Evaluating station 24 comprises a data storage stage in which information read off the strip of originals and information developed by evaluation of the originals is stored until such time as the originals involved reach their copying stations K1 or K2, copying station K1 comprising the components denoted by numerals 7-17 and copying station K2 those denoted by numerals 7'-17'.

When the originals to which the information stored at evaluating station 24 pertains reach the copying stations, that information is applied to an automatic exposure-control system 25. Exposure-control system 25 then issues command signals to the filter drive motors 13-15, 13'-15' and to the exposure shutters 17 for controlling the durations of exposure of each original in its component colors.

The illustrated arrangement operates as follows:

The strip of originals 1 is transported by transport system 3 from supply reel 2 to take-up reel 4 and initially passes through evaluating station 24, here located upstream of the first copying station K1 by a distance equal to the transport-direction length of at least two originals. At evaluating station 24, all the exposure-control data needed for the control of the exposure of each original is read and/or generated, and the exposure durations and/or exposure-light intensities for the three color components of each original are calculated for later application to automatic exposure-control system 25 when the corresponding originals actually reach the copying stations K1, K2 and the filter systems 9 and 9' are to be operated in accordance with the control data for those originals. During normal operation, such as described below, the exposure-control data developed for one original is used to control filter and shutter operation at station K1, that for the next original the filter and shutter operation at station K2, that for the third original the filter and shutter operation at station K1, and so forth, proceeding in alternation.

When two originals have been evaluated at evaluating station 24 and the data resulting from such evaluations registered, the two originals are then transported to the two copying stations K1, K2, the first of the two originals being located at station K2 and the second of the two originals being located at station K1, and the exposures of the two originals begin concurrently. The total exposure durations required for the two originals will typically differ from each other, and upon completion of the longer-duration exposure a transport command signal is generated, causing film transport system 3 to transport original 1 a distance of two originals, and causing paper transport system 20 to transport the print paper 18 a distance equal to two prints. As a result the next two originals, which had earlier been evaluated at evaluating station 24, move into respective ones of the two copying stations K1, K2. The exposure shutters 17, 17' are opened only during actual performance of copying exposures.

The machine operates as just described, for the case that all successive originals are identically spaced one from the next, with furthermore all originals on the strip being fit for printing and actually printed.

However, it may happen that segments of the strip 1 are not to be copied, e.g., a leading or trailing section of unexposed film intermediate two copiable originals, or one of a series of exposed originals evaluated as not fit for printing. In the preferred embodiment of the invention, originals not fit to be printed are not printed, and furthermore the incremental advancement of the copying medium 18 is modified in response to uncopiable originals so that the prints formed on the strip of copying medium 18 will consist exclusively of immediately successive prints of copiable originals without intervening gaps. Furthermore, the presence of uncopiable originals and/or intervals of unexposed film strip in the strip of originals 1 is not to be permitted to result in a loss of correlation between the copiable originals and their associated exposure-control data.

In the illustrated embodiment, this is accomplished by always positioning the first copiable original at the more downstream copying station K2 and copying it at that station. If the original which is, in that event, located at the more upstream copying station K1 happens to be an uncopiable original, no copying exposure is performed at station K1, and furthermore after the copying of the original at station K2 the copying medium 18 is transported not by a length of two prints as normal but instead by a length of only one print. I.e., when two copiable originals follow one after the other at correct spacing, the strip 1 is incrementally transported with an advancement increment of two originals, the copying medium 18 is transported with an advancement increment of two prints, and copying occurs at both copying stations K1, K2. However, in any other situation, e.g., where a copiable original is followed by a correctly spaced but uncopiable original, or where a copiable original is followed by a strip of film leader or trailer, the machine switches over to a mode of operation in which only the one copying station K2 is used at all. Accordingly, the original positioned stationary at station K2 will always be a copiable original, whereas the original positioned stationary at station K1 may be a copiable or a non-copiable original. In the first case, a two-original advancement increment is employed for strip 1 and a two-print advancement increment for strip 18; in the second case, a one-print advancement increment occurs for strip 18, and the strip 1 is advanced until such time as a copiable original reaches copying station K2.

The operation described above is particularly well suited for films provided with perforations correlatable with individual originals, such as type-126 and type-110 film. Similarly, the foregoing is applicable to 35-mm films too, provided that the notches with which the negatives of such film are provided coincide, within a limited tolerance range, with a distance of eight film perforations. However, if the internotch spacing is smaller or greater than such a distance, this is detected by suitable notch sensors at evaluating stations 24 and the machine then switches over to copying operation one original at a time, with only the downstream copying station K2 being used, with the copying medium 18, in correspondence thereto, being transported with an advancement increment of only one print at a time. As soon as the spacing between originals reverts to the normal distance, the machine switches back over into the two-at-a-time mode of copying operation.

In the embodiment described above, evaluating station 24 is provided in the copying machine. However, persons skilled in the art will appreciate the various modifications of approach which are possible. For example, the film may be transported through a previewing station for automated or semiautomated evaluation of originals, the results of the evaluation being registered on a transported data strip accompanying the film, with both the film and the data strip wound up onto a take-up reel and at a later time fed through the copying machine per se. In such case, when the copying machine operates in the two-at-a-time mode of operation, the exposure-control data pertaining to two successive originals would be read off the data carrier and used to control the two concurrent copying operations. Alternatively, each of the individual copying stations K1, K2 may be provided with its own original-evaluating system located at the respective copying station itself. In that case, the perforation or notch sensors could be positioned at the copying stations themselves; when a copiable original positioned at station K2 is accompanied by a copiable and correctly spaced original at station K1, two copying operations are performed concurrently, with, here again, copying station K1 being deactivated and the machine switching over to one-at-a-time operation when the original at station K2 is not accompanied by a copiable and correctly spaced original at station K1.

It will be understood that each of the elements described above, or two or more together, may also find a useful application in other types of constructions and modes of operation differing from the types described above.

While the invention has been illustrated and described as embodied in a copying machine having only two copying stations and operating on a two-at-a-time basis in a particular, but only exemplary manner, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A photographic copying machine for a strip of photographic originals, comprising means transporting the strip of originals along a predetermined transport path; plural copying stations located along the transport path for concurrent copying of respective ones of plural originals of the transported strip; means transporting copying medium along a predetermined transport path such that originals located at the plural copying stations are concurrently imaged onto the copying medium; and automatic exposure control means operative for effecting concurrent exposure of plural originals located at respective ones of the plural copying stations.

2. The photographic copying machine defined in claim 1, furthermore including an evaluating station located upstream of the copying station and provided with means evaluating transported originals and generating evaluation-dependent signals and including data-storage means storing the evaluation-dependent signals for application to the exposure-control means so that the latter expose the thusly evaluated originals in accordance with the evaluation-dependent signals when the thusly evaluated originals reach the copying stations.

3. The photographic copying machine defined in claim 1, furthermore including data-reading means operative for reading exposure-control data from a data carrier transported with the strip of originals.

4. The photographic copying machine defined in claim 1, furthermore including a plurality of evaluating stages each located at a respective one of the copying stations and each provided with means evaluating respective originals and generating exposure-control data for application to the exposure-control means.

5. The photographic copying machine defined in claim 1, including means operative when the originals are spaced by approximately constant distances for initiating the exposures of plural originals in the plural copying stations simultaneously and, upon completion of the longest of the exposures of the plural originals, transporting the strip of originals and the copying medium by a distance corresponding to the number of originals concurrently copied.

6. The photographic copying machine defined in claim 5, furthermore including means operative when the originals are not spaced by a predetermined constant amount one to the next for disabling all but the most downstream copying station and effecting transport of the strip of originals one original at a time and transport of the copying medium one copy at a time.

7. The photographic copying machine defined in claim 1, the copying stations closely adjoining each other, adjoining copying stations being separated by a separating wall which extends towards the copying medium and has a thin edge which rests upon the surface of the copying medium.

* * * * *